Figure 1:
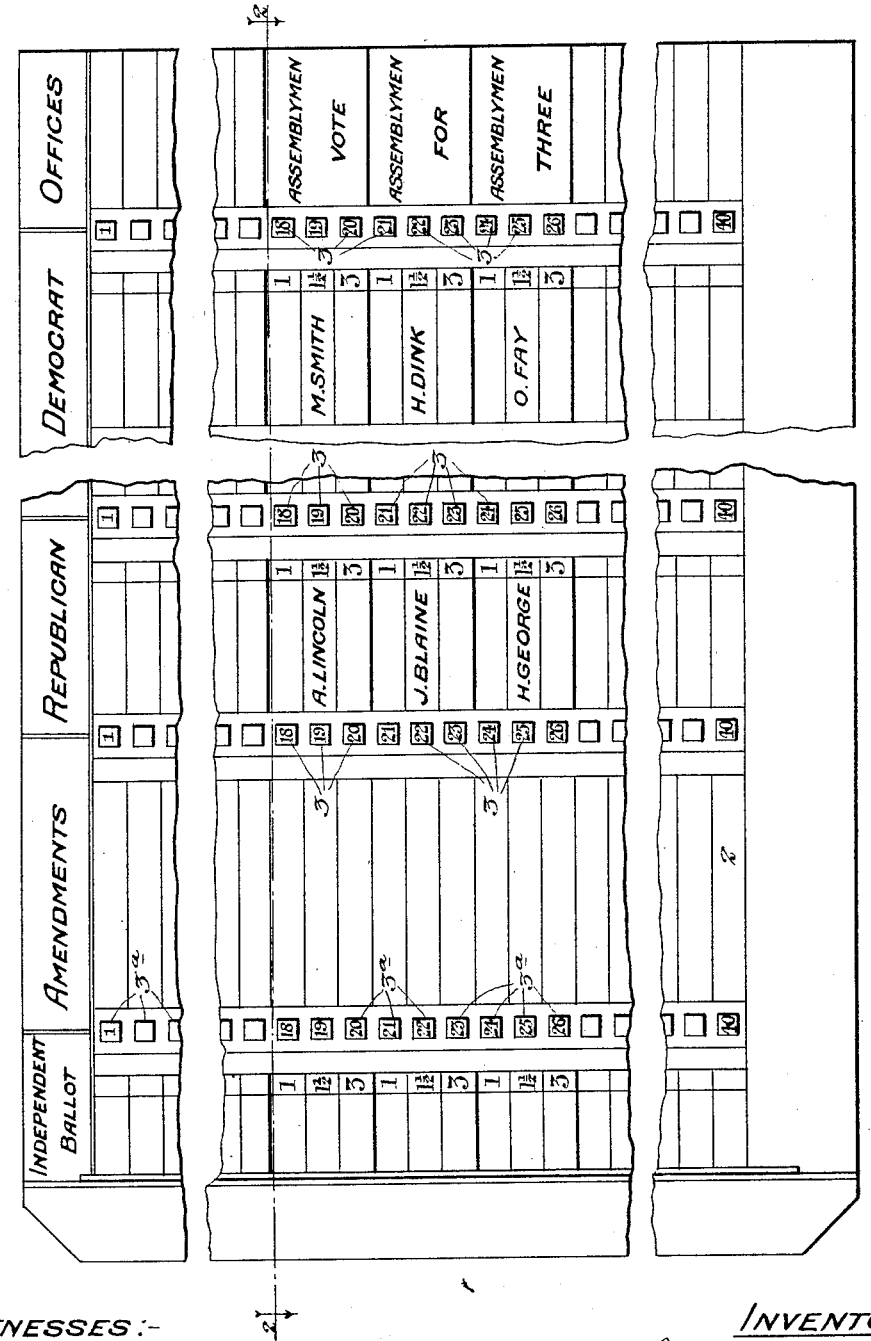

J. H. DEAN.
VOTING MACHINE.
APPLICATION FILED JUNE 17, 1907.

1,072,922.

Patented Sept. 9, 1913.
6 SHEETS—SHEET 1.

WITNESSES:—

INVENTOR:—
James H. Dean
BY: Pierce & Fisher
ATTORNEYS:—

J. H. DEAN.
VOTING MACHINE.
APPLICATION FILED JUNE 17, 1907.

1,072,922.

Patented Sept. 9, 1913.
6 SHEETS—SHEET 3.

INVENTOR
JAMES H. DEAN.
BY Peirce & Fisher
ATTORNEYS

WITNESSES:—

J. H. DEAN.
VOTING MACHINE.
APPLICATION FILED JUNE 17, 1907.

1,072,922.

Patented Sept. 9, 1913.
6 SHEETS—SHEET 4.

WITNESSES

INVENTOR
JAMES H. DEAN.
BY Peirce & Fisher
ATTORNEYS

J. H. DEAN.
VOTING MACHINE.
APPLICATION FILED JUNE 17, 1907.
1,072,922.
Patented Sept. 9, 1913.
6 SHEETS—SHEET 5.
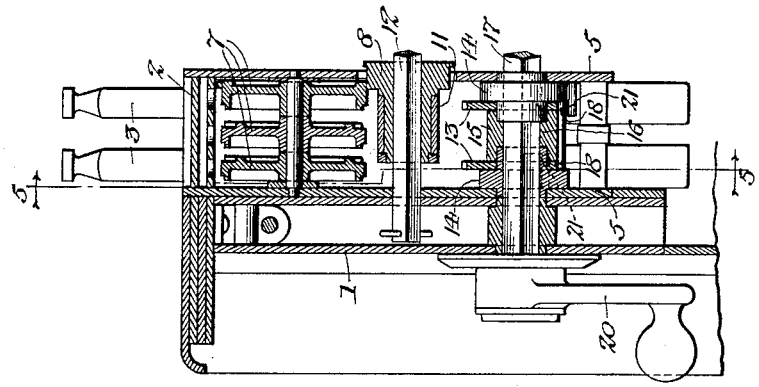
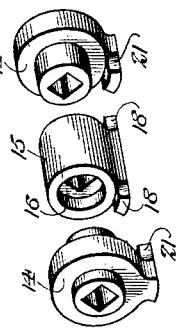
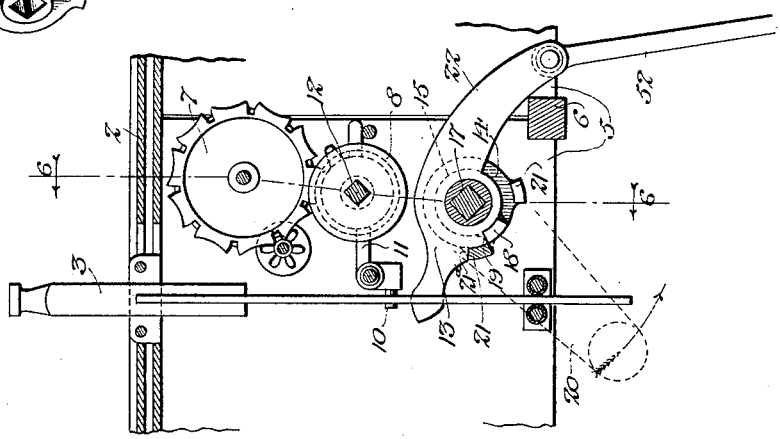
WITNESSES:-
Louis G. Whitehead
Lillian Prentice
INVENTOR:-
James H. Dean
BY Peirce & Fisher
ATTORNEYS:-
COLUMBIA PLANOGRAPH CO., WASHINGTON, D. C.

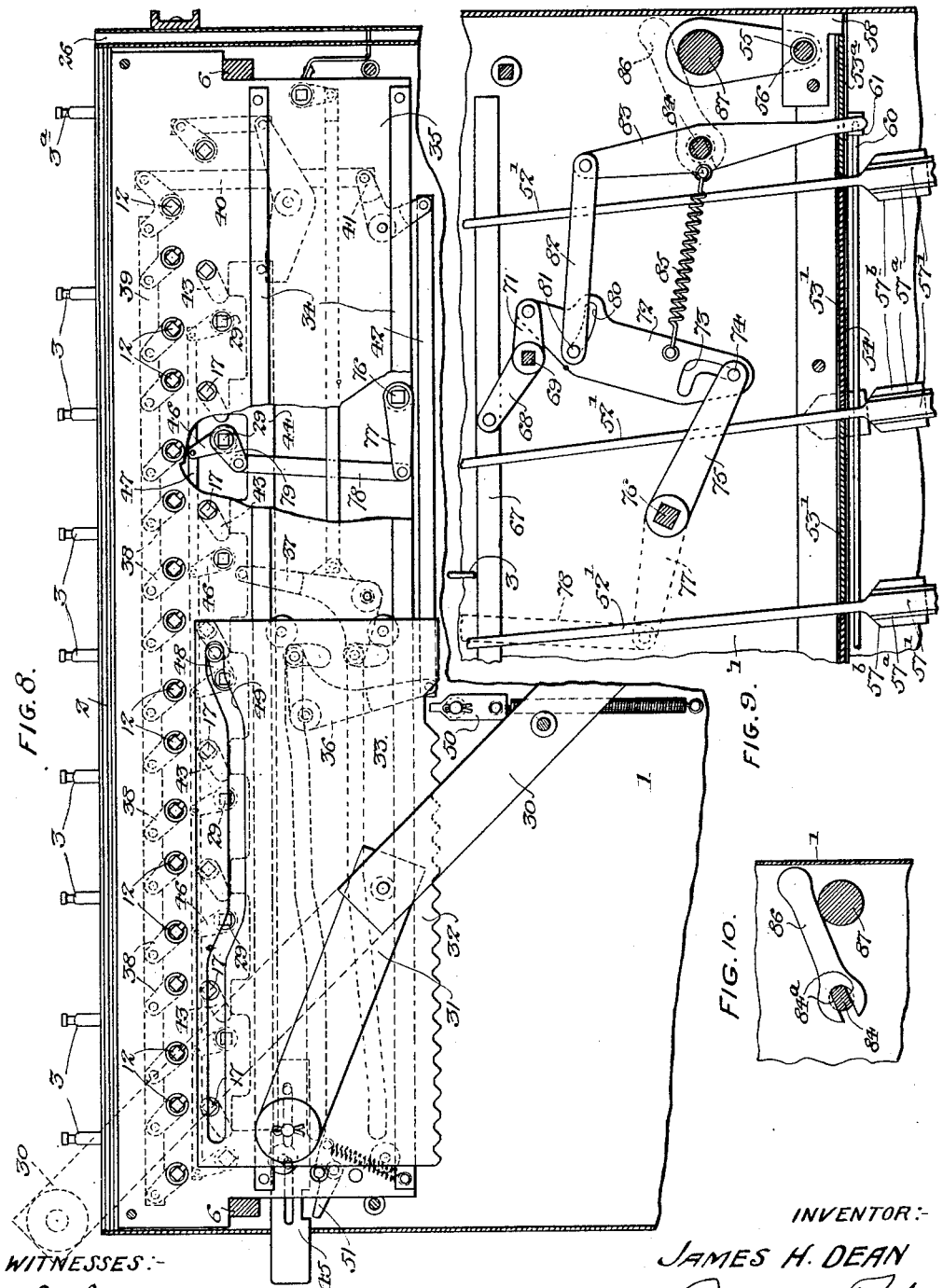

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

1,072,922.  Specification of Letters Patent.  Patented Sept. 9, 1913.

Application filed June 17, 1907. Serial No. 379,474.

*To all whom it may concern:*

Be it known that I, JAMES H. DEAN, a citizen of the United States, and a resident of Chicago, county of Cook, and State of Illinois, have invented certain new and useful Improvements in Voting-Machines, of which the following is a specification.

The invention relates to voting machines of the type which carries on its face a series of ballot indicators or keys operable by the voter and provided with interlocking mechanism for preventing the operation of more than a proper number of keys by a single voter and with counters or registers controlled by the keys to indicate the number of votes cast for the several candidates.

In some of the States, more particularly the State of Illinois, for certain offices such as that for assemblymen to the State legislature where a number of candidates are to be elected, the voter is entitled to cast all of his votes for a single candidate or divide them equally among any number of candidates equal to or less than the total number to be elected. That is to say, in most of the districts of the State of Illinois for example, three assemblymen are elected to the State legislature at each election. The voter may cast all three of his votes for a single candidate or give one vote and a half to each of two candidates or give one vote to each of three candidates. Any other distribution of the votes is not permitted under the law as construed by the election official.

The present invention seeks to provide suitable interlocking mechanism which may be adapted for use with multi-candidate groups of this sort, together with means by which the voter is prevented from distributing his votes, except in accordance with the legal requirements and also to provide suitable straight ticket mechanism whereby all of the candidates of a single party, including those for the assemblymen or other like office, may be voted through the means of a single party indicator or key.

With these objects in view, the invention consists in the features of construction, combinations and arrangements of parts hereinafter set forth, illustrated in the accompanying drawings and more particularly pointed out in the appended claims.

The machine to which the invention is applied is similar to that set forth in the prior application filed by me December 27, 1904, Serial No. 238,388. It will be understood however that the improvement can be modified for use in connection with other forms of machine.

Figure 2:
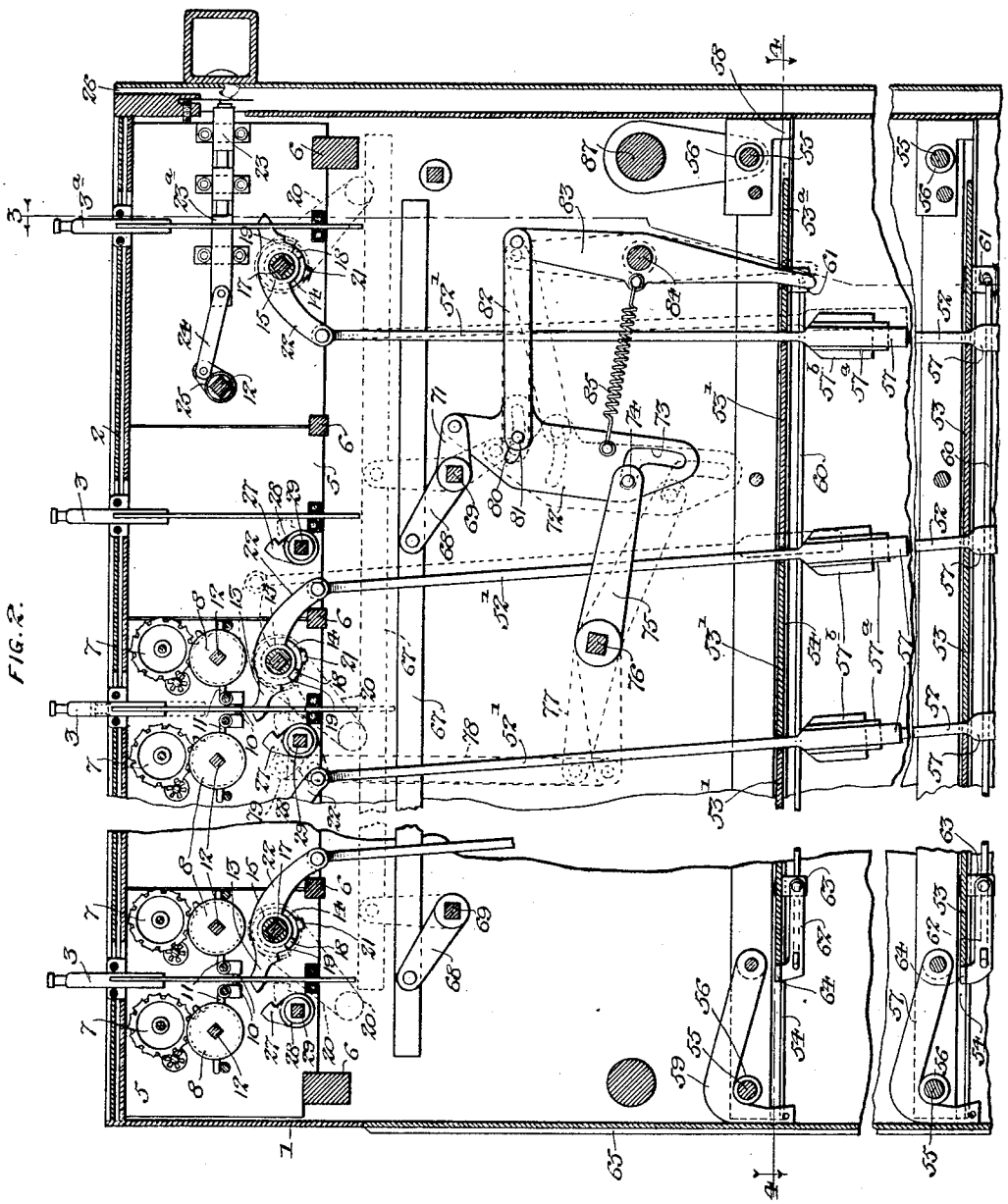
Figure 3:
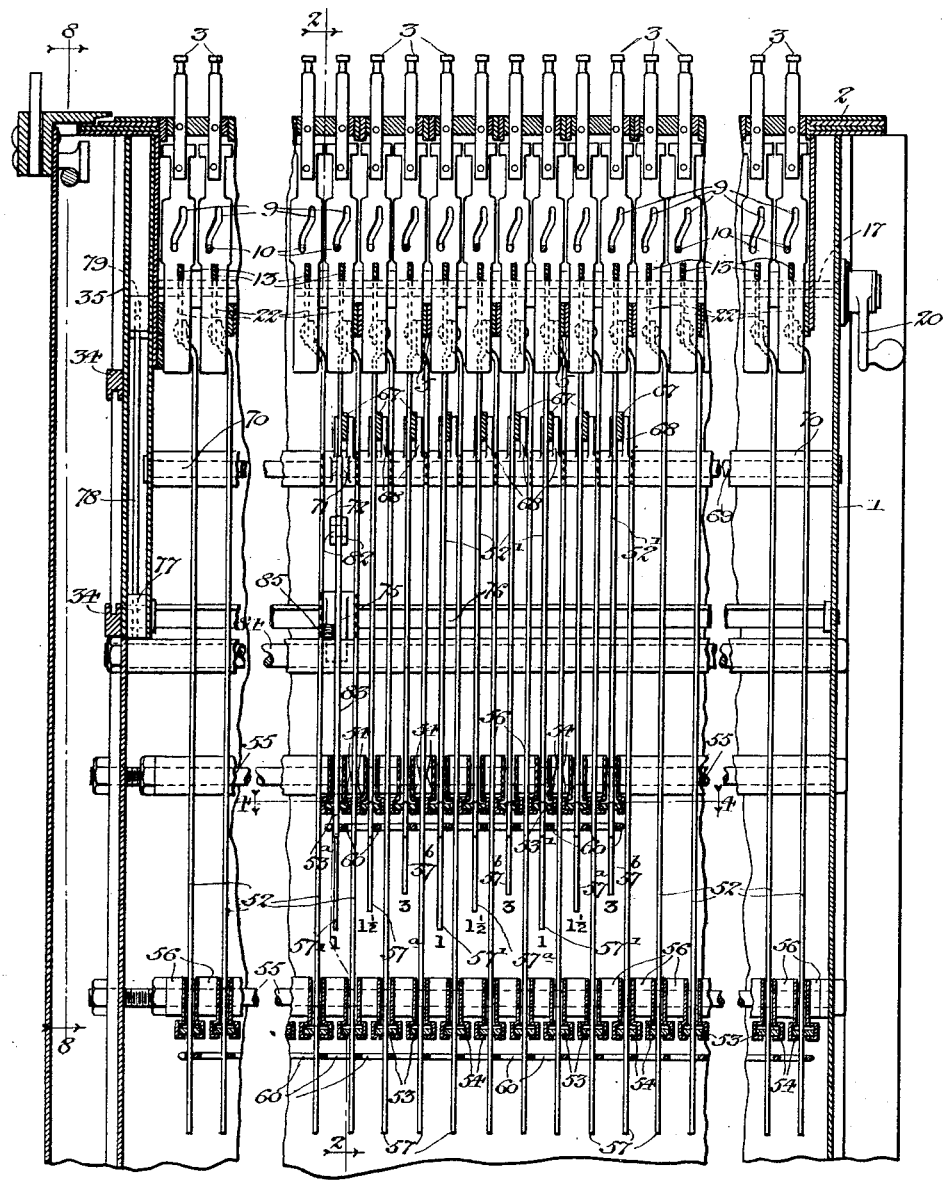
Figure 4:
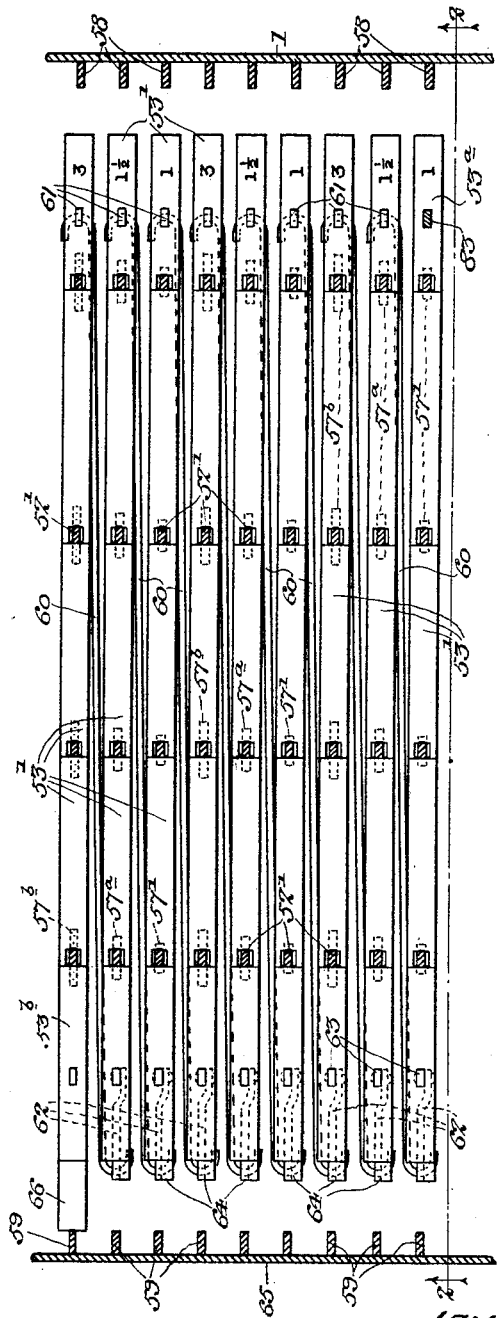

In the drawings Figure 1 is a view of the face or ballot plate of the machine, which in the form shown, is on the top of the frame or casing. Fig. 2 is a cross section through the machine from side to side on the lines 2—2 of Figs. 1 and 3 looking toward the front of the machine. Fig. 3 is a section from front to rear of the machine on the line 3—3 of Fig. 2. Fig. 4 is a plan view of the system of interlocking blocks for the "cumulative" group, parts being shown in section on the lines 4—4 of Figs. 2 and 3 and the supporting slideways for the interlocking blocks being omitted for the sake of clearness. Fig. 5 is a detail view on an enlarged scale of one of the ballot indicators or keys showing its connection with the straight ticket and restoring device, parts being shown in section on the line 5—5 of Fig. 6. Fig. 6 is a detail section on line 6—6 of Fig. 5. Fig. 7 is a detail perspective view of certain parts shown in Figs. 5 and 6. Fig. 8 is a view of the rear of the machine with the back plate removed, and with the parts shown in section on the line 8—8 of Fig. 3. Fig. 9 is a partial view similar to Fig. 2 with the parts shown in changed position. Fig. 10 is a detail view.

The machine comprises a box-like frame or casing 1 having a top plate 2 which carries the names of the several candidates preferably arranged in party column, as indicated in Fig. 1. The vote indicators or keys 3 project through the ballot or name plate 2 and are correspondingly arranged in columns extending from front to rear of the machine. The office lines or rows extend across the face or top of the machine from side to side thereof.

The keys and counters, as in the prior application referred to, are mounted in units or sections so that they may be readily assembled within the machine. These sections are formed of side plates 5 suitably connected and are mounted upon cross bars 6 extending from front to rear of the machine casing. Each section is provided with two keys and the corresponding counters 7 therefor are arranged on opposite sides of the keys. Rotary single toothed actuators 8 are arranged to engage intermittent gears on the units wheels of the counters. The keys 3 are provided with cam slots 9 (see Fig. 3) which engage pins 10 (see Fig. 5) on the actuator shifters 11 to move the actuators into and out of line with the corresponding counters as the keys are shifted to and from voted position. A series of shafts 12 extending through the actuators are oscillated by suitable operating mechanism under control of the voter or judge of election, so as to advance the counters corresponding to those keys which have been left by the voter in depressed or voted position. This counter and actuator mechanism is fully set forth in the prior application referred to No. 238,388.

A series of rock arms 13 are provided, one for each of the ballot indicators or keys. The rock arms for the two keys of each section are arranged on the same side of the keys and their ends engage openings in the keys below the cam slots 9. The two rock arms 13 of each section are journaled (see Fig. 6) upon the reduced inner ends of a pair of hubs or washers 14, which in turn are journaled in suitable openings in the side plates 5 of the unit section. The two rock arms are held apart by an intermediate spacing washer or hub 15 which is mounted upon the inner reduced ends of the hubs 14, and which is provided with a central web or portion 16 which extends inwardly between the inner ends of the two washers 14. The hubs or washers 14 and 15 are provided with square openings and these washers of the several office rows of sections are arranged in line and through them extend the locking and restoring shafts 17. These shafts are oscillated by the operating mechanism to release the keys as the voter is admitted to the machine that restore and lock them in normal position at the exit of the voter.

The hub 14 is provided at one portion with laterally extending lugs 18 (see Figs. 5, 6 and 7) which are arranged to engage shoulders 19 upon the rock levers 13. Normally, the shafts 17 hold the hubs 15 and the lugs 18 in position to lock the rock levers 13 and keys 3 in their uplifted or unvoted position. When the voter is admitted to the machine the shafts 17 are unlocked so that the voter may depress the keys. When he leaves the machine the shafts are oscillated to restore and lock the keys. The shafts 17 may also serve as straight ticket devices for shifting all of the keys in any one party column to voted position. For this purpose these shafts are provided on their forward ends with straight ticket indicators, keys or hand levers 20 (see Figs. 3 and 6) and the hubs or washers 14 (see Figs. 5, 6 and 7) are provided with inwardly extending lugs 21 that, when shifted by the movement of the corresponding shaft 17, are arranged to engage the tail portions 22 on the rock levers 13 to shift the same and depress or move the corresponding column of keys to voted position.

It will be noted, as shown in Figs. 2 and 5, that the lugs 21 are normally spaced some distance from the tail pieces 22 of the rock levers so that the shafts have a lost motion connection with the rock levers. This lost motion must be first taken up before any one shaft can act to move all of the keys in any one row to voted position. This lost motion permits the independent shift of the individual keys, which would of course be prevented if the hubs 14 and 15 having the lugs 18 and 21, formed a rigid connection between the shafts 17 and the rock arms 13. It is often desirable to disconnect certain of the keys so that they will not be operated by the straight ticket shaft. Such is the case for example, when a party has made no nomination for a certain office or offices. With the construction shown, this is readily effected by shifting the corresponding hubs or washer 14 through a quarter turn to bring the lugs 21 thereon against shoulders 21$^a$ on the rock arms. One of the hubs is shown so shifted in Figs. 5 and 6. The shafts 17 may be then shifted by the straight ticket lever or crank 20$^a$ to the end of its movement (viz. to a full quarter turn of the present construction) without bringing the lug 21 upon the hub 14 into engagement with the corresponding rock arm. In this way any one or more keys in any given column can be readily detached from the straight ticket operating mechanism. It will be understood in this connection, that, as set forth in the prior application, the shafts 17 may be readily withdrawn from the machine in preparing it for an election to permit this change in position of the hubs 14 to disconnect one or more of the keys from the straight ticket shaft.

At one side of the machine are arranged a column of keys 3$^a$ of the irregular ballot mechanism for voting for candidates not regularly nominated. These keys and the mechanism controlled thereby are also mounted in units or sections similar to the counter sections previously described. Each of these keys is arranged to control a printer 23 and actuator 23$^a$ therefor that is connected by a link 24 to an operating crank 25 that is journaled between the side plates of the section. One of the actuator shafts 12 extends through the hubs of the several cranks 25 and is oscillated by the actuating mechanism to shift the printers corresponding to those keys which have been left in voted position. The printers are arranged to mark a suitable paper ballot inserted into a slot 26 at one side of the top plate of the machine, as set forth in the prior application filed by me July 25, 1905, Serial No. 271,216, which application sets forth this irregular ballot mechanism in detail.

A series of dogs 27 are mounted on hubs 28 that are journaled between the side plates of the unit sections. These hubs are provided with square openings through which the shafts 29 extend. The dogs 27 are arranged opposite the ends of the rock arms 13 and the shafts 29 are oscillated by the operating mechanism to bring the dogs into engagement with the ends of the rock arms to complete the movement of any partially depressed key or keys or to restore any key or keys which have not been depressed sufficiently to set the associated actuators and interlocking spreaders. This mechanism is set forth in detail in the application filed by me April 1, 1907, Serial No. 365,639.

The operating mechanism illustrated in Fig. 8 for controlling the movement of the actuator shafts 12, the locking and restoring shaft 17 and the dog-operating shafts 29 is also similar to that set forth in the prior application, Serial No. 365,639. This mechanism comprises the main operating lever 30 pivoted to the back of the machine and arranged to be controlled by the voter, connected by a link 31 to a carriage comprising a ratchet plate 32 and a cam plate 33 secured thereto. The cam plate is mounted to slide between guides 34 mounted upon the back of the main operating section 35, and is provided with two cam slots for oscillating the bell cranks 36 and 37 mounted within the main operating section. The main operating section is also provided with a series of rock arms 38 engaging the ends of the actuator shafts 12 and connected by links 39 and 40, bell crank 41 and link 42 to the actuating bell crank 36. A series of rock arms 43 within the main operating section engage the ends of the locking and restoring shafts 17 and are arranged to be engaged by lugs upon a sliding locking and restoring bar 44. This locking and restoring bar is shifted in one direction, to release the locking and restoring shafts 17 and the voter's keys by means of a sliding intervening bar 45 which projects through an opening in the casing at the rear of the machine and is operated by the judge or other officer of election. The locking and restoring bar 44 is shifted in the other direction to restore and lock the keys by the bell crank 37.

The rock arms 46 journaled within the main operating section, are connected together by a bar or link 47 and one of the shafts 29 is provided with a crank 48 engaging a cam slot 49 in the upper edge of the ratchet plate 32. The lower edge of the plate 32 is provided with ratchet teeth which are engaged by a full-stroke pawl 50 to compel the complete shift of the carriage and main operating lever 30 in one or the other direction.

When the voter is admitted to the machine, the main operating lever is at the left hand side or at the right hand when viewed from the rear, as in Fig. 8. The voter first shifts the operating lever 30 by means of a handle on its upper end to the position shown in Fig. 8. This serves to move the bell crank 37 to release the locking and restoring bar 44 and also, at the end of the movement of the lever, trips a latch 51 so that the intervening bar 45 may be thrust inwardly by the judge or other officer of election, to move the locking and restoring bar and release the shafts 17 and the individual ballot indicators or keys. When the voter has set the keys to cast his vote for the various candidates, he returns the operating lever 30 to its normal position so that the actuator shafts 12 are oscillated and the counters corresponding to the keys left in voted position are advanced one step. At the end of this return movement of the main operating lever, the locking and restoring bar 44 is shifted to restore and lock the keys in normal position through the medium of the shafts 17. At the same time the intervening bar 45 is thrust outwardly and locked into position by the latch 51. The dog-operating shafts 29 are also oscillated by the return movement of the operating lever, through the medium of the cam slot 49 and the ratchet plate 32. It will be noted that the three cam slots controlling the operation of the three sets of shafts are so shaped that the dog-operating shafts 17 will be oscillated before the actuator or locking and restoring shafts are moved, and any partially depressed keys will be moved completely to voted position or restored to their normal, unvoted position before the counter actuators are moved.

The number of the regular and irregular keys or ballot indicators 3 and 3ª which may be operated by a single voter, is properly limited by suitable interlocking mechanism comprising a series of swinging arrows or spreaders 52 which are pivoted to the tail pieces 22 of the rock arms 13 and extend downwardly between the interlocking slides or blocks 53. The blocks are arranged in rows, one row for each office line and are mounted to slide in supporting guides or channels 54 mounted upon cross rods 55 extending from front to rear of the machine. The supporting guides or channels 54 are properly spaced from one another by intermediate washers 56 mounted upon the cross rods 55. The ends of the interlocking blocks 53 are notched out to receive the small or shaft portions of the arrows or spreaders and the latter are provided below the rows of blocks with enlarged wedge shaped heads 57. By shifting any one of the keys the corresponding arrow or spreader will be drawn up to bring its enlarged lower end or spreader portion into line with the row of blocks to spread the same. By suitably limiting the spread or movement of the rows of blocks, the number of spreaders which may be drawn up and the number of associated keys which can be shifted to voted position, will be properly limited. By connecting two or more rows of blocks, two or more of the office lines of voting mechanisms may be thrown into a multi-candidate group.

Each supporting guide or channel is provided at one end with a stop lug 58 and at its opposite end with a pivoted hook 59, both of which extend downwardly into line with the row of blocks in the channel. The rows of blocks are connected and disconnected for grouping the machine for different elections by means of a series of tie-rods 60. There is one of these tie-rods between each pair of adjacent rows of blocks and it is pivotally connected at its ends to a lug 61 on the end block of one row and to a hook 62 that is pivoted to a lug 63 on the opposite end block of the next adjacent row. The hooks 62 are provided on their ends with off-set lugs 64 so that by removing a side door 65 on the machine and lifting the hooks 59, the hooks 62 may be arranged with their lugs 64 either in or out of the channels or supporting guides 54. When the hook 62 at the end of any one row is arranged with its lugs 64 in the channel, that and the next adjacent row will be connected for multi-candidate voting. Any number of rows may be thus connected and the movement of the two outside end blocks properly limited by means of one of the stops 58 engaging one outside end block and a spacer block, such as shown at 66 in Fig. 4, interposed between one of the hooks 59 and the other outside end block of the group.

The interlocking mechanism described is set forth in detail in the companion application filed by me May 27, 1907, Serial No. 375,782.

In arranging the machine for a group of candidates in which the voter is permitted by law to cast all of his votes for a single candidate or to distribute the same among two or more candidates, the interlocking mechanism associated with the counters in such a group is somewhat modified. This peculiar method of voting is known as "cumulative" voting and in the drawings the improvement is shown as arranged for electing representatives or assemblymen to the legislature of the State of Illinois where three of such officers are elected from each district. As shown in Fig. 1, three keys designated respectively as 1, 1½ and 3 are associated with the name of each candidate upon the face or ballot plate 2 of the machine, so that nine office lines of the keys in the regular party columns and in the column of irregular or independent balloting keys are devoted to this purpose. These nine office lines in Fig. 1 are numbered 18 to 26 respectively. This arrangement necessitates no change in the counters since the total vote for any candidate may be readily determined by multiplying the total count shown by the counter of the "1½ vote" key by 1½ and the total shown by the "3 vote" key by three and adding the results together with the total shown by the "1 vote" counter. The printers controlled by the keys in the independent ballot column will correspondingly indicate upon the irregular ballot the number of votes intended to be cast for independent candidates. It is necessary however, that certain of these keys shall be detached from the straight ticket keys or indicators. This will be done by properly setting the washers 14 on the straight ticket shafts 17 in the manner previously described. If a party has three candidates for the office of assemblymen or representative, the "one vote" keys associated with the names of these candidates will be connected to the straight ticket shaft and the other keys of these candidates will be disconnected therefrom. If a party has but two candidates for such office, the "1½ vote" keys of these candidates will be connected to the straight ticket shaft and the others disconnected therefrom, while if a party has but a single candidate the "3 vote" key associated with that candidate's name will be connected to the straight ticket shaft and all of the others disconnected. By this arrangement it is possible to provide both individual and straight ticket keys in connection with the mechanisms for "cumulative" voting.

The nine rows of keys and counters used for "cumulative" voting are preferably provided with an additional or supplemental interlocking mechanism comprising an additional set of swinging arrows or spreaders 52' which coöperate with an additional set of interlocking blocks 53'. The arrows 52' like the arrows 52, are connected to the tail pieces of the rock arms 22 associated with the keys in the "cumulative" group. The arrows 52' however, are somewhat shorter than the arrows 52 and the nine rows of blocks 53' associated therewith are arranged above the blocks of the regular interlocking mechanism, as clearly shown in Figs. 2 and 3. The supporting channels and means for connecting and limiting the movement of the rows of blocks 53' are entirely similar to the corresponding parts associated with the interlocking blocks 53. This special set of blocks 53' and arrows or spreaders 52' associated therewith must be so arranged as to permit the shift of three "1 vote" keys or two "1½ vote" keys or one "3 vote" key to voted position. The nine rows of blocks 53' are connected, as indicated in Fig. 4, by placing the lugs 64 on the hook 62 of the first eight rows of blocks within the channels or supporting guides so that the end blocks of the adjacent rows of the entire group are connected each to the other. The movement of the two outside end blocks of the entire group (which are designated for convenience 53ª and 53ᵇ) is limited at one end by one of the stops 58 and at the other end by a spacer block 66 of suitable length interposed between the end block 53ᵇ and the hook 59 in line therewith. When the blocks are all moved as far as possible toward one end of the group, as shown in Fig. 4, the lost motion in the entire connected series is represented by the space between the end block 53 and the adjacent stop 58.

The spreader portions 57' on the arrows 52' associated with the rows of blocks numbered one, are of the same thickness as the spreader portions 57 on the arrows 52 and such that three of these arrows can be operated before the lost motion in the connected group of blocks 53' is taken up. Correspondingly, the width of the spreader portions 57ª of the arrows 52' associated with the rows of blocks numbered 1½ are of such thickness that two only can be operated before the interlocking space is taken up, while the spreader portions 57ᵇ of the arrows 52' associated with the rows of spreader blocks numbered three are of such thickness that the operation of one of them is sufficient to take up the lost motion in the connected series of blocks. It is obvious by this arrangement that the voter may shift three "1 vote" keys or two "1½ vote" keys or one "3 vote key" to voted position, but thereafter cannot operate any of the other keys or ballot indicators in the "cumulative" group unless he first retracts one or more of the keys to correct or change his vote.

Instead of having the spreader portions of the arrows 52' of different thicknesses, differential lever connections between the rows of blocks could be employed as in the construction set forth in my companion application filed May 27, 1907, Serial No. 375,782. The arrows or spreaders 52 extend downwardly from the rows of keys in the "cumulative" group between the supporting channels 54 for the special set of blocks 53' and into engagement with the rows of blocks 53 of the regular interlocking mechanism. In an election where the "cumulative" office is not to be filled, the nine rows of keys there used for "cumulative" voting may be readily adapted for ordinary voting by throwing the special interlocking mechanism out of operation by removing the spreader block 66 (see Fig. 4). This may readily be effected when the side door 65 is removed by lifting the adjacent hook 59. The supplemental interlocking mechanism will then have no effect upon the keys associated therewith, and the keys may be grouped in any desired manner by means of the rows of blocks 53 of the regular interlocking mechanism.

It will of course be understood that it is not necessary to provide the supplemental interlocking mechanism, since the rows of blocks 53 could be employed by substituting arrows having spreader portions of different widths for the arrows or spreaders 52 of the regular interlock. It is convenient however, to have two sets of arrows and two sets of interlocking blocks for the nine rows of keys in the "cumulative" group so that they may be readily interchanged from one to the other style of voting. Where the set of keys are used for "cumulative" voting the rows of blocks 53 of the regular interlocking mechanism are preferably connected together and so grouped as to permit the operation of three of the keys so that an additional group is provided for properly limiting the number of votes which may be voted by a single voter.

As the Illinois law is interpreted by the election officials, a voter may distribute his three votes for assemblymen or representative in the manner above permitted, but he cannot distribute them in any other way. It is necessary therefore, to provide additional means for preventing the voter from casting, for example, but one or two "1 votes" or a single "1½ vote" or one "1 vote" and one "1½ vote." That is to say, additional mechanism is provided for canceling any number of votes less than three cast by a single voter. For this purpose a series of key restoring bars 67 are arranged beneath the office lines of keys employed for "cumulative" voting (see Figs. 2 and 3). Each of these bars is mounted for parallel movement on a pair of rock arms 68, the hubs of which are provided with square openings and the two series of arms are carried upon a pair of square shafts 69 extending from front to rear of the machine. The arms may be shifted upon the shafts to set the restoring bars 67 in accordance with the position of the "cumulative" voting keys in the machine. Spacing sleeves 70 upon the shaft 69 hold the set of arms 68 and restoring bar 67 in proper position. These restoring bars are shifted by the operating mechanism to restore any of the "cumulative" voting keys, if improperly set in voted position. But if the voter has properly operated the keys in the group arranged for "cumulative" voting the operating mechanism for the means for shifting the restoring bars 67, will be rendered inoperative.

The hub of one of the arms 68 is provided with a crank 71 (see Figs. 2 and 9) which is pivoted to the upper end of the link 72. At its lower end this link is provided with an L-shaped slot 73 which engages a pin 74 upon the end of a crank arm 75. The latter is mounted upon a shaft 76 extending from front to rear of the machine and provided at its rear end (see Fig. 8) with a crank arm 77. This crank arm is connected by a link 78 to a crank arm 79 upon one of the dog-operating shafts 29. The link 72 is also provided adjacent its upper end with an arc-shaped slot 80 (see Figs. 2 and 9) which engages a pin 81 on the end of a link 82. The opposite end of the link is pivoted to the upper end of a swinging lever 83 that is pivotally mounted between its ends upon a cross stay-bolt 84. The lower end of this arm 83 (see Figs. 2 and 4) extends within an opening in the outside end block 53ª of the group of blocks 53' arranged for "cumulative" voting. The lever 83, crank 75, arm 71 and the links connected thereto, may be slid along the respective supporting shafts so as to be properly located in the machine in accordance with the location of the group of voting mechanisms arranged for "cumulative" voting.

A light spring 85 extends between the lower end of the link 72 and the central portion of the swinging lever 83. This spring serves to hold the link 72 in position with the pin 74 on the arm 75 in the end of the horizontal part of the L-shaped slot 73. It also exerts a slight pressure upon the end block 53ª so that when the keys and spreaders are in their normal, unvoted position, the blocks will be held in the position shown in Fig. 4. The spring 85 is, as stated, attached to the central part of the lever 83 so that it offers but slight resistance to the shift of spreaders within the rows of blocks.

If the voter should properly distribute his votes for assemblymen or representative by casting three votes for one candidate or 1½ votes for each of two candidates, or one vote for each of three candidates, he will of course so operate the spreaders as to take up all of the interlocking space in the connected group of blocks 53' and shift the end block 53ª against the stop 58. This will also move the arm 83 and link 82 until the pin 81 on the latter has moved to the end of the slot 80 in the link 72 and shifted the link to bring the vertical portion of the L-shaped slot 73 in line with the pin 74 on the arm 75. Then, when the voter returns the main operating lever and carriage and shifts the arm 75 through the connection described, the pin 74 on the arm will move idly within the vertical portion of the slot 73 (see Fig. 9) without shifting the link 72 or the restoring bars 67. But if the voter should cast less than three full votes, that is to say, if he should attempt to distribute them in any improper way, the movement of the end block 53ª and of the lever 83 connected thereto will not be sufficient to bring the vertical portion of the slot 73 in line with the pin 74. Then when he returned the main operating lever and carriage to register his vote and restore the machine to normal condition, the arm 75 in moving from full line position to the dotted line position would draw down with it the link 72, the downward movement of which link would rock the crank 71 and the crank 68, shifting the restoring bars 67 to return the improperly voted keys in the group arranged for "cumulative" voting, as indicated in dotted lines in Fig. 2. The arm 75, as stated, is actuated from the actuating machine though the medium of one of the dog-operating shafts 29 and, as previously described, these are oscillated in advance of the movement of the actuator shafts so that any improperly voted keys in the "cumulative" group would be restored before their associated actuators were operated. In this way, a voter's ballot will not be counted unless he has cast the same in accordance with the requirements of the election officials.

If the "cumulative" group is not to be employed at an election the special interlocking mechanism is thrown out of operation, as previously stated, by removing the spacer block 66 (see Fig. 4). Means are also preferably provided for holding the interrupting or intercepting means which prevents the improper distribution of the votes, out of operation. This is effected, in the form shown, by a lock-out device 86 (see Figs. 9 and 10) having a forked end adapted to snugly engage square locking faces or slots 84ª upon the shaft 84. The opposite end of the lock-out device 86 engages one of the cross bars 87 of the machine and when in position shown in dotted lines in Fig. 9 and in full lines in Fig. 10, serves to permanently hold the shaft 84 in the position shown with the vertical portion of the slot 73 in line with the pin 74. The special mechanism thus employed for "cumulative" voting is entirely locked out of operation, though the keys and counters thereof may be employed for ordinary voting. Moreover, the special mechanism may be readily thrown into operation by removing the lock-out device 86 and properly grouping the special series of interlocking blocks 53'.

It is obvious that numerous changes may be made in the details set forth without departure from the essentials of the invention. If retractile interlocking blocks were used the spring 85 could be dispensed with.

Having described my invention, what I claim as new and desire to secure by Letters Patent is:

1. In a voting machine, the combination with a series of voting devices and controlling keys therefor arranged in line, a rock shaft common to all of said keys having a party indicator or key operatively connected thereto, rock arms loosely mounted on said shaft and engaging said individual keys and a set of adjustable sleeves on said shaft having lugs for engaging said rock arms.

2. In a voting machine, the combination with a series of voting devices and controlling keys therefor arranged in line, a member common to said series of keys having a party key operatively connected thereto and lugs on said member having a one-way connection with said series of keys, said lugs being adjustable out of operative position, whereby said party member may be operated without operating all of said keys.

3. In a voting machine, the combination with a series of voting devices and a series of controlling keys therefor arranged in line, of a rock shaft common to said series of keys, rock arms loosely mounted on said shaft engaging said keys, adjustable lugs on said shaft having a one-way connection with said rock arms, and a party indicator or key connected to said shaft.

4. In a voting machine, the combination with a series of voting devices and controlling keys therefor, of a universal member common to all of said keys, a party key and locking and restoring mechanism operatively connected to said universal member, said member having lost motion connections with said keys for shifting them to voted position or restoring them to initial position, said connections being adjustable on said member to prevent the shift of one or more of said keys to voted position by means of said party key.

5. In a voting machine, the combination with a series of voting devices and a series of controlling keys therefor arranged in line, of a universal member common to said keys, a party key connected to said member for shifting the same in one direction, locking and restoring mechanism for shifting said member in the opposite direction, said member having a set of lugs engaging said keys for restoring them to initial position and a second set of adjustable lugs for selectively connecting said keys thereto so as to be shiftable by said party key to voted position.

6. In a voting machine, the combination with a series of voting devices and a series of controlling keys therefor arranged in line, of a rock shaft common to said keys and rock arms loosely mounted on said shaft and engaging said keys, a set of lugs on said shaft engaging said arms to restore said keys to initial position and a set of adjustable lugs for selectively engaging said rock arms to shift one or more of said keys in the opposite direction to voted position, a party indicator or key connected to said shaft and locking and restoring mechanism for moving said shaft.

7. In a voting machine, the combination with a series of voting devices arranged in multi-candidate group for "cumulative" voting, and limiting mechanism therefor permitting the voter to cast all of his votes for a single candidate or to distribute the same, of means controlled by the initial setting of said voting devices for restoring the same before the complete operation thereof when improperly voted.

8. In a voting machine, the combination with a series of voting devices arranged in multi-candidate group for "cumulative" voting, of interlocking mechanism therefor limiting the number of votes to be cast by a single voter to a predetermined number but permitting the voter to cast all of his votes for a single candidate or to distribute the same equally among a number of candidates equal to or less than the number to be elected and means for restoring said voting devices before the complete operation thereof when otherwise voted.

9. In a voting machine, the combination with a series of voting devices arranged in multi-candidate group for "cumulative" voting, of interlocking mechanism therefor limiting the number of votes to be cast by a single voter in the group to a predetermined number but permitting the voter to cast all of his votes for a single candidate or to distribute the same and means for restoring said voting devices to initial position when less than the predetermined number of votes are cast by the voter.

10. In a voting machine, the combination with a series of counters and counter controlling keys arranged in multi-candidate group for "cumulative" voting, of interlocking mechanism for limiting the number of votes to be cast by a single voter to a predetermined number but permitting the voter to cast all of his votes for a single candidate or to distribute the same equally among a number of candidates equal to or less than the number to be elected and mechanism controlled by the shift of the keys to voted position for restoring the same before the complete operation of the counters when less than the predetermined number of votes have been cast.

11. In a voting machine, the combination with a series of counters and counter controlling keys arranged in multi-candidate group for "cumulative" voting, a progressively movable interlock therefor limiting the number of votes to be cast by the voter to a predetermined number but permitting the voter to cast all of his votes for a single candidate or to distribute the same, means for restoring said keys to initial position before the complete operation of said counters and devices controlled by said progressively movable interlock for actuating said restoring device when less than the predetermined number of votes have been cast.

12. In a voting machine, the combination with a series of counters and counter-actuators under the voter's control and arranged in multi-candidate group for "cumulative" voting, of differential interlocking mechanism therefor limiting the number of votes to be cast by a single voter to a predetermined number but permitting the voter to cast all of his votes for a single candidate or to distribute the same and means controlled by said interlocking mechanism for restoring said counters and actuators to initial position before the complete operation thereof when less than the predetermined number of votes have been cast.

13. In a voting machine, the combination with a series of voting devices arranged in multi-candidate group for "cumulative" voting, of means under the voter's control for initially operating said voting devices, mechanism for completing the operation thereof and restoring the same to initial condition, interlocking mechanism for said voting devices limiting the number of votes to be cast by a single voter to a predetermined number but permitting the voter to cast all of his votes for a single candidate or to distribute the same equally among a number of candidates equal to or less than the number to be elected, and means controlled by the initial setting of said devices for restoring the same before their complete operation when less than the predetermined number of votes have been cast.

14. In a voting machine, the combination with a series of voting devices arranged in multi-candidate group for "cumulative" voting, mechanism for completing the operation of said devices and interlocking mechanism therefor limiting the number of votes to be cast by a single voter to a predetermined number but permitting the voter to cast all of his votes for a single candidate or to distribute the same equally among a number of candidates and means controlled by said interlocking mechanism and actuated by said operating mechanism for restoring the voting devices to initial position before the complete operation thereof when less than the predetermined number of votes have been cast.

15. In a voting machine, the combination with a series of counters and counter-actuators arranged in multi-candidate group for "cumulative" voting, of interlocking means limiting the number of votes to be cast by a single voter to a predetermined number but permitting the voter to cast all of his votes for a single candidate or to distribute the same equally among a number of candidates and mechanism for completing the operation of said counters and counter-actuators and for restoring the same and means controlled by the initial setting of said actuators by the voter and actuated by said operating mechanism for restoring the counters and actuators before the complete operation thereof when less than the predetermined number of votes have been cast.

16. In a voting machine, the combination with a series of counters and counter controlling keys operable by the voter, of mechanism for completing the operation of the counters corresponding with the voted keys and means controlled by said keys and actuated by said mechanism for restoring the keys and counters before the complete operation thereof when improperly voted.

17. In a voting machine, the combination with a series of counters and counter controlling keys operable by the voter arranged in multi-candidate group for "cumulative" voting, of interlocking mechanism therefor limiting the number of votes to be cast by a single voter to a predetermined number but permitting the voter to cast all of his votes for a candidate or distribute the same equally among a number of candidates, operating mechanism for said counters, means actuated by said operating mechanism for restoring the keys and counters before the complete operation thereof and means controlled by said interlocking mechanism for disconnecting said restoring means from said mechanism when the full number of votes have been cast.

18. In a voting machine, the combination with a series of counters and counter controlling keys arranged in multi-candidate group for "cumulative" voting, of interlocking mechanism limiting the number of votes to be cast by a single voter to a predetermined number but permitting the voter to cast all of his votes for a single candidate or to distribute the same equally among a number of candidates, operating mechanism for restoring said keys and counters, a supplemental means for restoring said keys and counters before the complete operation thereof and a shiftable connection between said operating mechanism and said supplemental restoring means and connection being controlled by said keys and set in operative position when less than the predetermined number of votes have been cast.

19. In a voting machine, the combination with a series of counters and counter controlling keys arranged in multi-candidate group for "cumulative" voting, of differential interlocking mechanism therefor limiting the total number of votes to be cast by a single voter to a predetermined number but permitting the voter to cast all of his votes for a single candidate or to distribute the same equally among a number of candidates, mechanism for completing the operation of said keys and counters, means for restoring said keys and counters before the complete operation thereof and an actuating connection between said restoring means and said operating mechanism, said connection being controlled by said interlocking mechanism and held in operative position thereby when less than the predetermined number of votes have been cast.

20. In a voting machine, the combination with a series of counters and counter controlling keys arranged in multi-candidate group for "cumulative" voting, of differential, progressively moving interlocking mechanism therefor limiting the number of votes to be cast by a single voter to a predetermined number but permitting the voter to cast all of his votes for a single candidate or to distribute the same, mechanism for completing the operation of said keys and counters, means for restoring said keys and counters before the complete operation thereof and a progressively movable actuating connection between said restoring means and said operating mechanism, said actuating connection being connected to and controlled by said interlocking mechanism and set in operative position when less than the predetermined number of votes have been cast.

21. In a voting machine, the combination with a series of counters and counter controlling keys arranged in multi-candidate group for "cumulative" voting, of interlocking mechanism therefor limiting the number of votes to be cast by a single voter in the group to a predetermined number but permitting the voter to cast all of his votes for a single candidate or to distribute the same, mechanism for completing the operation of said keys and counters an operating handle therefor, supplemental restoring means for said keys and counters for preventing the complete operation thereof and a shiftable device controlled by said interlocking mechanism and set in operative position when less than the predetermined number of votes have been cast for connecting said supplemental restoring means and said operating handle.

22. In a voting machine, the combination with a series of voting devices arranged in multi-candidate group for "cumulative" voting and comprising a set of counters and counter controlling keys for each candidate in the group, the counters and keys of each set representing respectively different numbers of votes, of interlocking mechanism for limiting the number of votes to a predetermined number and comprising a series of interlocking blocks, spreaders operated by the keys and varying in thickness in accordance with the varying denomination of said keys and means controlled by said interlocking mechanism for restoring said keys and counters before the complete operation thereof when less than the predetermined number of votes have been cast.

23. In a voting machine, the combination with a series of voting devices arranged in multi-candidate group for "cumulative" voting and comprising a set of counters and counter controlling keys for each candidate in the group, the counters and keys of each set representing respectively different numbers of votes, of interlocking mechanism for limiting the number of votes to a predetermined number and comprising a series of interlocking blocks, spreaders operated by the keys and varying in thickness in accordance with the varying denomination of said keys, operating mechanism for said keys and counters and means actuated by said operating mechanism and controlled by said interlocking mechanism for restoring said keys and counters before the complete operation thereof when less than the predetermined number of votes have been cast.

24. In a voting machine, the combination with a series of voting devices arranged in multi-candidate group for "cumulative" voting and comprising a set of counters and counter controlling keys for each candidate in the group, the counters and keys of each set representing respectively different numbers of votes, of interlocking mechanism for limiting the number of votes to a predetermined number and comprising a series of interlocking blocks, spreaders operated by the keys and varying in thickness in accordance with the varying denomination of said keys, operating mechanism controlling said keys and counters, supplemental restoring means for preventing the complete operation of said keys and counters and means for operatively connecting said restoring means to said operating mechanism, said connecting means being controlled by said interlocking mechanism and set for operation when less than the predetermined number of votes have been cast.

25. In a voting machine, the combination with a series of voting devices arranged in multi-candidate group for "cumulative" voting with limiting means associated therewith for permitting the voter to cast all of his votes for a single candidate or to distribute the same equally among a number of candidates equal to or less than the number to be elected, additional limiting or interrupting means for preventing any other distribution of the votes and a device for locking said additional limiting means out of operation.

26. In a voting machine, the combination with a series of voting devices arranged in multi-candidate group for "cumulative" voting and comprising a set of three counters and counter controlling keys for each candidate in the group, the counters and keys of each set representing respectively one, one and one-half and three votes, of interlocking mechanism interposed between said sets of counters and keys limiting the total number of votes to be cast by a single voter to three but permitting the operation of the keys and counters of different denomination and means for restoring said keys and counters before the complete operation thereof when less than three votes have been cast.

JAMES H. DEAN.

Witnesses:
LILLIAN PRENTICE,
KATHARINE GERLACH.

Copies of this patent may be obtained for five cents each, by addressing the "Commissioner of Patents, Washington, D. C."